June 4, 1940.  W. E. SMITH  2,203,287
ROTARY HOPPER AND INCLINED CHUTE
Original Filed Oct. 3, 1935   4 Sheets-Sheet 1

INVENTOR.
WILLIAM E. SMITH
ATTORNEY.

INVENTOR.
WILLIAM E. SMITH
ATTORNEY.

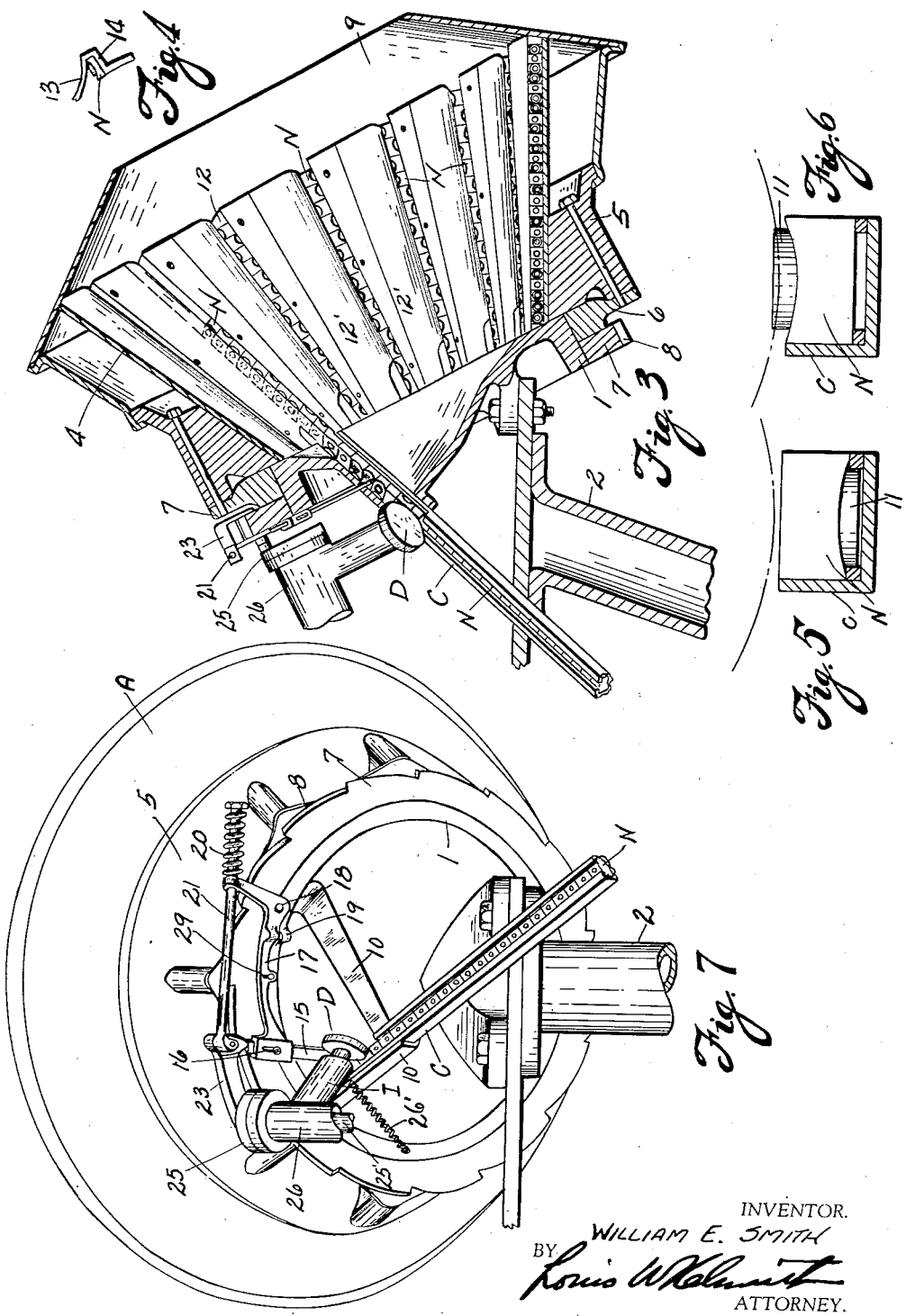

June 4, 1940. W. E. SMITH 2,203,287
ROTARY HOPPER AND INCLINED CHUTE
Original Filed Oct. 3, 1935 4 Sheets-Sheet 4

INVENTOR.
WILLIAM E. SMITH
ATTORNEY.

Patented June 4, 1940

2,203,287

UNITED STATES PATENT OFFICE

2,203,287

ROTARY HOPPER AND INCLINED CHUTE

William E. Smith, Detroit, Mich., assignor to The Midland Steel Products Company, Cleveland, Ohio, a corporation of Ohio Original application October 3, 1935, Serial No. 43,393. Divided and this application February 10, 1937, Serial No. 125,060

8 Claims. (Cl. 10—170)

This invention relates to new and useful improvements in apparatus for automatically feeding individual work pieces and is a division of my co-pending application Serial No. 43,393 filed October 3, 1935, issued as Patent No. 2,078,694, April 27, 1937.

An important object of the invention is to provide a hopper into which unarranged work pieces are dumped and which will automatically position the work pieces in rows and deliver them to the chute, there being provided trip mechanism which assures the chute being maintained full of the devices arranged in proper position by means of the automatic engagement of means for turning the hopper on its axis whenever the upper end of the chute becomes empty.

A further object of the invention is to provide sorting means associated with the upper end of the chute for removing therefrom improperly positioned devices and returning them to the hopper for proper disposition.

Other objects and advantages of the invention will become apparent during the course of the following description.

In the accompanying drawings forming a part of the application and wherein like numerals are employed to designate like parts throughout the several views—

Figure 1:
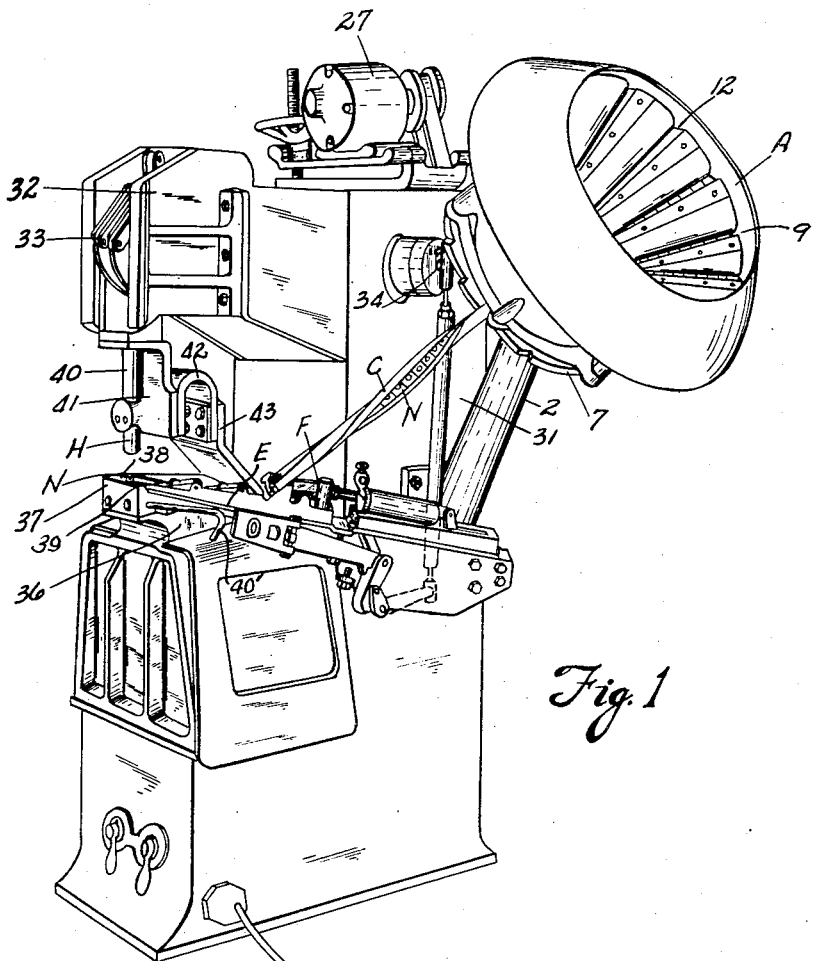
Figure 1A:
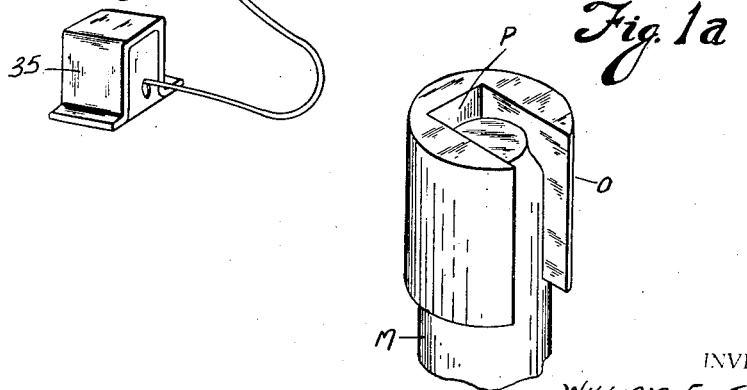
Figures 2, 2A:
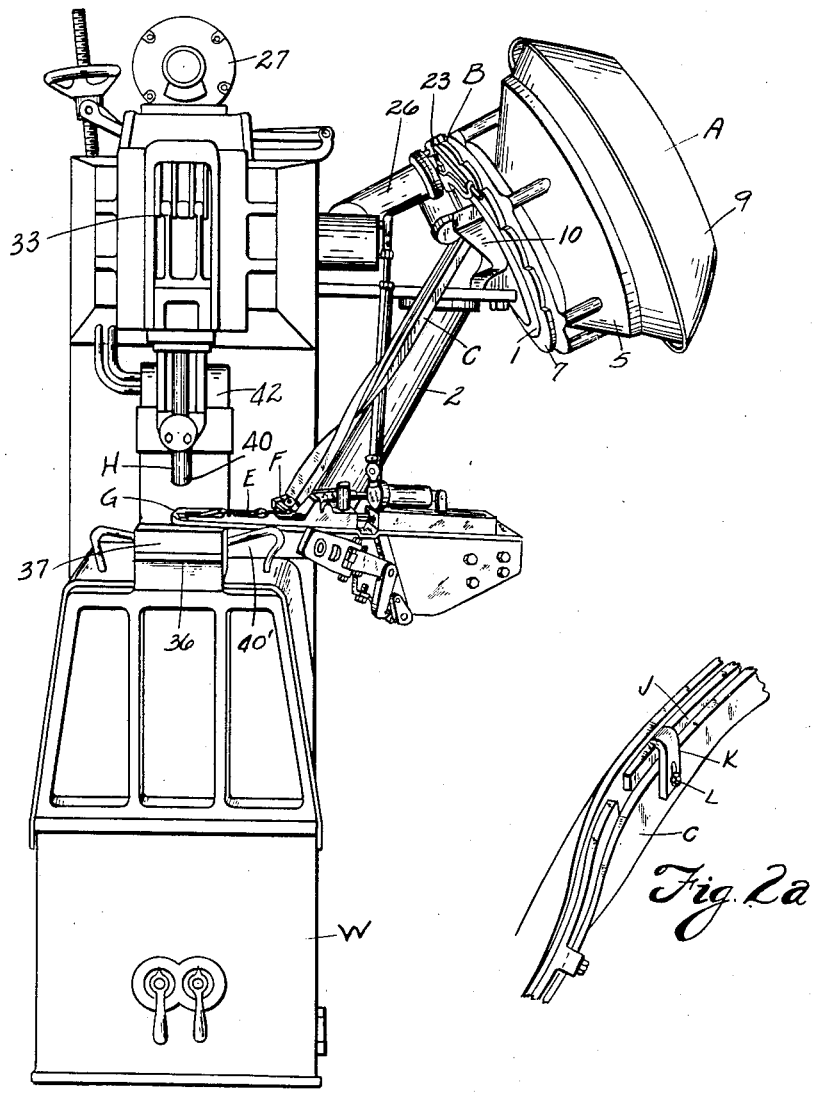
Figure 8:
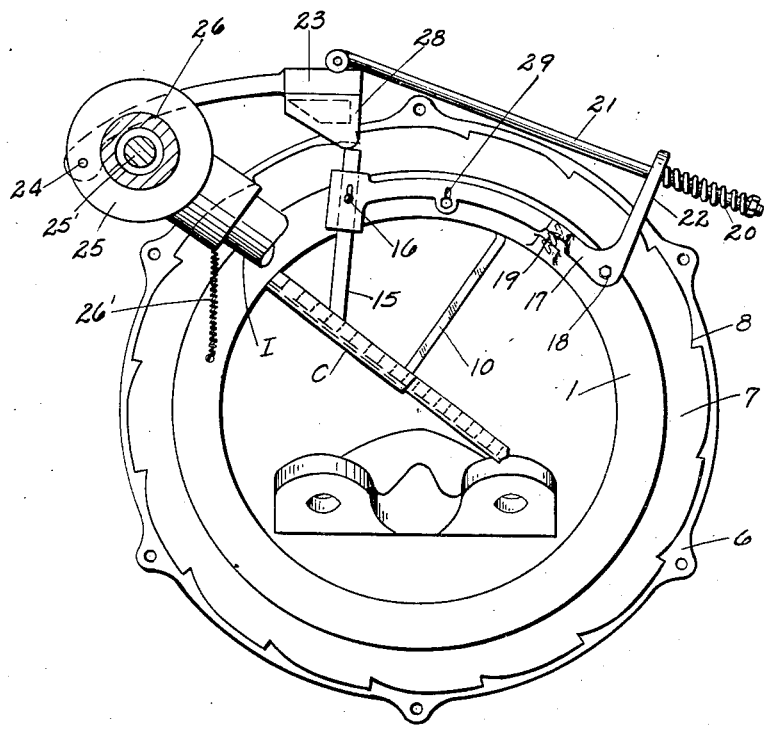
Figure 9:
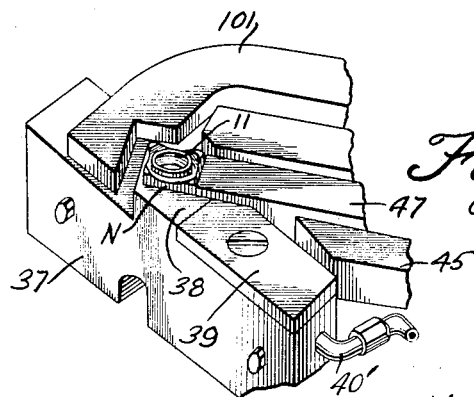

Fig. 1 is a perspective view of the welding machine with the automatic feeder applied thereto, Fig. 1a is a perspective view of a modified form or stationary electrode, Fig. 2 is a front elevation of the welding machine, Fig. 2a is an enlarged perspective view of part of the chute showing the adjustable closure therefor, Fig. 3 is an enlarged vertical section taken through the feeding hopper, Fig. 4 is an enlarged transverse section through a section of the hopper illustrating one of the grooves into which the unarranged devices in the hopper fall, Fig. 5 is an enlarged transverse section of the upper end of the chute at the point where the sorting device is arranged and illustrating a device properly positioned in the chute, Fig. 6 is a similar section showing a device improperly positioned in the chute and in a position to be kicked into the hopper by the sorting device, Fig. 7 is a rear elevation of the back of the hopper illustrating the mechanism for periodically operating the same, Fig. 8 is an enlarged elevation of the trip mechanism for automatically throwing into operation the pawl and ratchet mechanism for turning the hopper, Fig. 9 is an enlarged perspective view illustrating the integral receiving pocket formed on the secondary electrode with the forward end of the shuttle shown cooperating therewith and the forward end of the work lifter.

Briefly, the apparatus is designed for welding steel clinch nuts N to various articles such as brackets and side rails of automobile frames and consists briefly of a rotatable nut feeding hopper A into which is dumped a quantity of unarranged nuts N. This hopper feeds the nuts to a downwardly inclined chute C from which a sorting device D removes improperly disposed nuts and transfers them back into the hopper to be again fed to the chute. This open sided chute C is given a turn or twist intermediate its ends through 180 degrees to dispose the open side of the chute at the underside of its lower end to further shield the steel nuts from the magnetic field adjacent the transformer and electrodes. The nuts are transferred from the chute to the shuttle E by a transfer mechanism F and are fed one by one between the electrodes H upon each separation thereof. It will be noted that the nuts are fed through a shielded shuttle mechanism to prevent their being influenced by magnetic fields to clog the shuttle or from influencing the action of the electrodes. During each separation of the electrodes H, a work lifter G is automatically moved vertically to lift the work with the nut welded thereto from the lower electrode.

The hopper A is rotatably mounted upon a bearing ring 1 bolted to the upper end of an upwardly inclined pedestal 2 which is fastened at its lower end to the side of a welding machine W. This causes the hopper to be disposed at an oblique angle with respect to the side of the welding machine with the upper open end of the hopper facing outwardly from the side of the machine and rearwardly thereof. The inner wall 4 of the hopper is in the shape of a truncated cone which is supported by an annular casting 5 bolted to a bearing ring 6 which is rotatably mounted on the bearing 1 and has secured thereto and also mounted on the bearing 1, a ratchet ring 7 having peripheral teeth 8 for engagement with a mechanism which turns the hopper through the distance of one tooth each time the upper end of the chute C is devoid of nuts. The wall 4 of the hopper meets a wall 9 of the mouth at an angle to provide capacity for a large number of unarranged nuts. The bearing ring 1 is formed with an integral enclosed slide 10 inclined downwardly to the lower portion of the hopper, and into this slide extends and is attached thereto, the upper open sided end of chute C so that nuts improperly positioned in the chute may be sorted out of the same by means of a continually rotated sorting knurled wheel D which moves through the circular path indicated by the dot and dash lines of Figs. 5 and 6, to engage only those nuts having their locating bosses 11, disposed uppermost in the chute so as to be engaged with the sorting wheel and thereby removed from the upper end of the chute to be returned to the hopper by means of the slide 10.

The wall 4 of the hopper is provided with a plurality of circumferentially spaced grooves radiating from the apex of the truncated conical wall 4 to be brought successively into direct alignment with the upper end of the chute C and stopped by the relation of ratchet teeth 8 thereto, so that all nuts in each groove will slide by gravity into the upper end of the chute, as best appreciated from Fig. 3. Fig. 4 shows a section of one of these grooves in which the leading wall 13 is inclined to induce the nuts to tumble into the groove, while the trailing wall 14 of each groove is normal to the annular wall 4 to provide a ledge insuring that the nuts lodged therein are carried upwardly upon counter-clockwise turning of the hopper to become aligned with the upper end of the chute as hereinbefore explained. The leading edge of the end 12' of each groove nearest the apex of the cone is enlarged to induce the nuts into the groove. Of course, these grooves are of sufficient size to receive various size nuts or the sides of the grooves may be provided with adjustable plates or removable plates interchangeable with others to adapt the grooves to receive various sizes and shaped nuts.

The hopper is not continuously rotated but is only turned a partial revolution equal to the distance between a pair of grooves 12 whenever the upper end of the chute C is devoid of a supply of nuts. This operation is controlled by a vertically movable trip 15 which is spring projected upon the upper sides of the nuts passing through the open upper end of chute C, serving as a feeler, as it were, to automatically throw into operation the mechanism for turning the drum whenever the upper end of the chute is devoid of nuts. This assures a constant supply of nuts to the chute as long as there is a supply in the hopper A. This trip 15 is adjustably connected as at 16 to the extremity of one arm of a bell crank 17 fulcrumed as at 18 on the flange of bearing ring 1. A compression spring 19 is interposed between the long arm of bell crank 17 and a lug formed on bearing ring 1 so as to balance the bell crank more or less against the compression spring 20 mounted on pawl rod 21 between a shorter arm 22 of bell crank 17 and an abutment carried by the free end of the rod 21. The pawl rod 21 extends through arm 22 and the other end of the rod 21 is pivotally connected to the frame end of a gravity pawl 23 which has its other end eccentrically mounted as at 24 on a disc 25 keyed to a drive shaft 25' mounted in casing 26 extending toward the welding machine and mounted for turning about its axis. This casing is urged by a spring 26' to urge its extension I, carrying the shaft of sorting wheel D, downwardly so that the knurled sorting wheel is yieldingly held against the nuts entering the chute. This shaft 25' is continuously driven by an auxiliary electric motor 27 mounted in any suitable place on the welding machine and suitable gearing is arranged between shaft 25' and the shaft of the knurled sorting wheel D. Due to the mounting of this pawl 23, its natural tendency is to be lowered by gravity to seek seating against one of the ratchet teeth 8, but normally it is held disengaged therefrom by its cam surface 28 riding on the upper end of trip 15. In order to limit the oscillation of the trip arm 17, a stop 29 extends from the bearing ring 1 and operates in a slot of arm 17.

From the foregoing, it will be appreciated that whenever the upper end of chute C is empty, the trip bar 15 will move downwardly and thereby lower the continually reciprocating pawl 23 into such position that it will drop behind a tooth 8, and upon its next clockwise movement will cause corresponding movement of ratchet ring 7 and consequently the hopper A as viewed in Fig. 8. The spring 20 causes the rod 21 to yieldingly swing the bellcrank so that the trip 15 is yieldingly forced into the chute whenever it is empty and rod 21 moves to the left of Figs. 7 and 8. When the rod 21 is removed to the right, the trip 15 is free to be moved up out of the path of the nuts. Due to the limited throw of the pawl 23 the hopper will only be moved through a distance equal to the space between a pair of grooves 12 so as to dispose the next groove 12 in alignment with the upper end of the chute whereby the nuts in said groove automatically feed by gravity into the upper end of the chute and slide under the trip bar 15 which will hold the pawl 23 disengaged from the ratchet to stop movement of the hopper until the upper end of the chute again becomes empty.

As best appreciated from Figs. 5, 6 and 9, each nut is provided on one face with an axially extending boss or pilot 11 surrounding which and extending in the same direction are triangular welding projections formed at the four corners of the nut. Those nuts which enter the upper end of the chute in the position shown in Fig. 6 with the pilot 11 up will be disposed in the path of movement of the sorting wheel D and therefore will be kicked out of the chute back into the hopper as hereinbefore explained. Therefore only those nuts disposed as in Fig. 5 will pass the sorting wheel, but it is necessary to have all of the nuts, when fed into the welding machine, disposed with the pilots 11 uppermost as shown in Fig. 6 to locate the work thereon. In addition, the major length of the chute C is of channel cross section with an opening extending lengthwise thereof in order that the operator may determine whether the nuts are properly feeding therethrough, at all times. In order to shield these steel nuts insofar as is possible from being influenced by the magnetic field of the transformer and electrodes, the intermediate portion of the downwardly inclined chute C is twisted through 180 degrees so that the imperforate bottom of the chute is disposed uppermost at its lower end as clearly shown in Figs. 1 and 2. This lower end of the chute feeds by gravity into a transfer and shuttle mechanism which feeds the nuts, one at a time, between the electrodes of a welding machine W.

To close the channel of the brass chute C and to render it adaptable to feed various size nuts, an adjustable brass closure strip J made in one piece or sections, is curved to conform to the twist of the chute to fit in the open channel as shown in Fig. 2a. This closure is formed with integral slotted lugs K adjustably fastened to the side of the chute with screws L entering threaded openings therein.

The welding machine W is built generally on the order of a punch press having a base 30, upright 31 and overhanging head portion 32 which overhangs the bed of the machine to house a toggle mechanism 33 actuated by the usual horizontal crankshaft 34 which is caused to make a complete revolution each time the treadle mechanism 35 is depressed by the operator. Within the forward portion of the base is mounted a welding transformer having one core leg 36 of the secondary extended upwardly to form the bed of the machine and to which a lower stationary electrode 37 is secured. This electrode 37 is provided with an upwardly extending right angular pocket 38 of magnetizable material which is magnetically energized by the transformer and is adapted to closely fit the two sides of a nut fed thereto by the shuttle bar 47 operating in the shuttle body 45 and to magnetically attract the nut into the pocket as it is advanced by the shuttle bar 47. Secured to the top of the electrode in abutting relation with the extension 38 to cover the upper portion of the stationary electrode is a copper plate 39. This stationary electrode is water cooled by circulating coolant through its hollow body by means of pipes 40'. If desired, the stationary electrode may assume the form of an upstanding post M as illustrated in Fig. 1a with a magnetic cap O having a polygonal recess P to receive and position a nut feed from the shuttle, in welding position upon the top of post M.

Reciprocably mounted directly above the stationary electrode is a movable electrode 40 operated by the toggle 33 each time the welding machine is energized so as to descend upon a plate having a perforation to receive the boss 11 of nut N in pocket 38 to complete the circuit therethrough and cause fusion of the corner projections of the nut with the plate. The reciprocatory carrier 41 for the upper movable electrode is connected by relatively short buss plates 42 to an upward extension 43 of one leg of the transformer core so as to reduce current losses by directing the current in the shortest possible path from electrode to electrode. The stationary electrode is of course connected to the other leg of the transformer core.

It is to be understood that various changes in the size, shape and arrangement of parts may be resorted to without departing from the spirit of the invention or the scope of the appended claims.

I claim:

1. The combination with a downwardly inclined chute and a rotary hopper, of a bearing member having its axis inclined in the same direction as said chute and provided with an integral return chute extending from the first named chute to the hopper and inclined in a direction opposite to the inclination of the first named chute, said hopper being rotatably mounted upon said bearing member and having walls provided with article receiving grooves which are successively aligned with the first named chute to deliver articles by gravity thereto, and a constantly rotating member disposed adjacent said first named chute to kick improperly arranged articles in said chute into the bearing chute to return them into the hopper.

2. In a device of the character described, a rotary hopper rotatable about an axis inclined to the horizontal and having a conical wall provided with longitudinal grooves to receive objects to be dispensed, each of said grooves having a leading wall inclined relative to a plane radial to the wall of the hopper to induce the objects to tumble into the grooves, and having a trailing wall normal to the wall of the hopper to provide a ledge to support the objects in each groove as the hopper turns about its axis.

3. A feeding mechanism comprising a hopper mounted for rotary movement and having a ratchet ring, a feed chute arranged to receive articles from the hopper, a reciprocable pawl engageable with the ratchet ring for turning the hopper, a pivoted lever having a trip extending into said chute and supporting said pawl, and a rod having one end connected to the pawl and its other end slidably connected with said lever.

4. A feeding mechanism comprising a hopper mounted for rotary movement and having a ratchet ring, a feed chute arranged to receive articles from the hopper, a reciprocable pawl engageable with the ratchet ring for turning the hopper, a pivoted lever having a trip extending into said chute and supporting said pawl, a rod having one end connected to the pawl and its other end extending through said lever, and a spring mounted on said rod between its extended end and said lever.

5. A feeding mechanism comprising a hopper mounted for rotary movement and having a ratchet ring, a feed chute arranged to receive articles from the hopper, a reciprocable pawl engageable with the ratchet ring for turning the hopper, a bellcrank lever having one arm provided with a trip extending to the chute, said trip supporting said pawl, a rod pivoted to said pawl and connected to said lever, and spring means normally urging said trip towards said chute.

6. A feeding mechanism comprising a hopper mounted for rotary movement and having a ratchet ring, a feed chute arranged to receive articles from the hopper, a reciprocable pawl engageable with the ratchet ring for turning the hopper, a bellcrank lever having one arm provided with a trip extending to the chute, said trip supporting said pawl, a rod pivoted to said pawl, and slidably engaged with the other arm of the bellcrank and extended therebeyond, and a spring mounted on the extended end of the rod and abutting said bellcrank.

7. A feeding mechanism comprising a hopper mounted for rotary movement and having a ratchet ring, a feed chute arranged to receive articles from the hopper, a reciprocable pawl engageable with the ratchet ring for turning the hopper, said pawl having a lower inclined surface, a lever having a trip extending into said chute to engage articles passing therethrough and to be held thereby in engagement with said inclined surface of the pawl and cause the latter to be lifted above the ratchet ring when the pawl is at one limit of its movement in one direction, and said trip gravitationally lowering when there are no articles in the chute thereby permitting the pawl to gravitationally lower behind a ratchet tooth as the pawl moves toward said limit of its movement.

8. A feeding device comprising an inclined chute of channel-shaped cross section twisted on its axis to dispose the open portion of the channel section to open downwardly at the lower end thereof, and a closure plate conforming to the twist of the chute and being adjustably connected thereto to close the downwardly facing open portion of the channel section, said closure having means for adjustably connecting it to the chute whereby the chute may be adapted to different sized articles passing therethrough.

WILLIAM E. SMITH.